Oct. 26, 1926.

C. O. A. SMEDBERG 1,604,242

CULINARY MACHINE

Filed Nov. 16, 1921   2 Sheets-Sheet 1

WITNESSES

INVENTOR.
Carl Oscar A. Smedberg

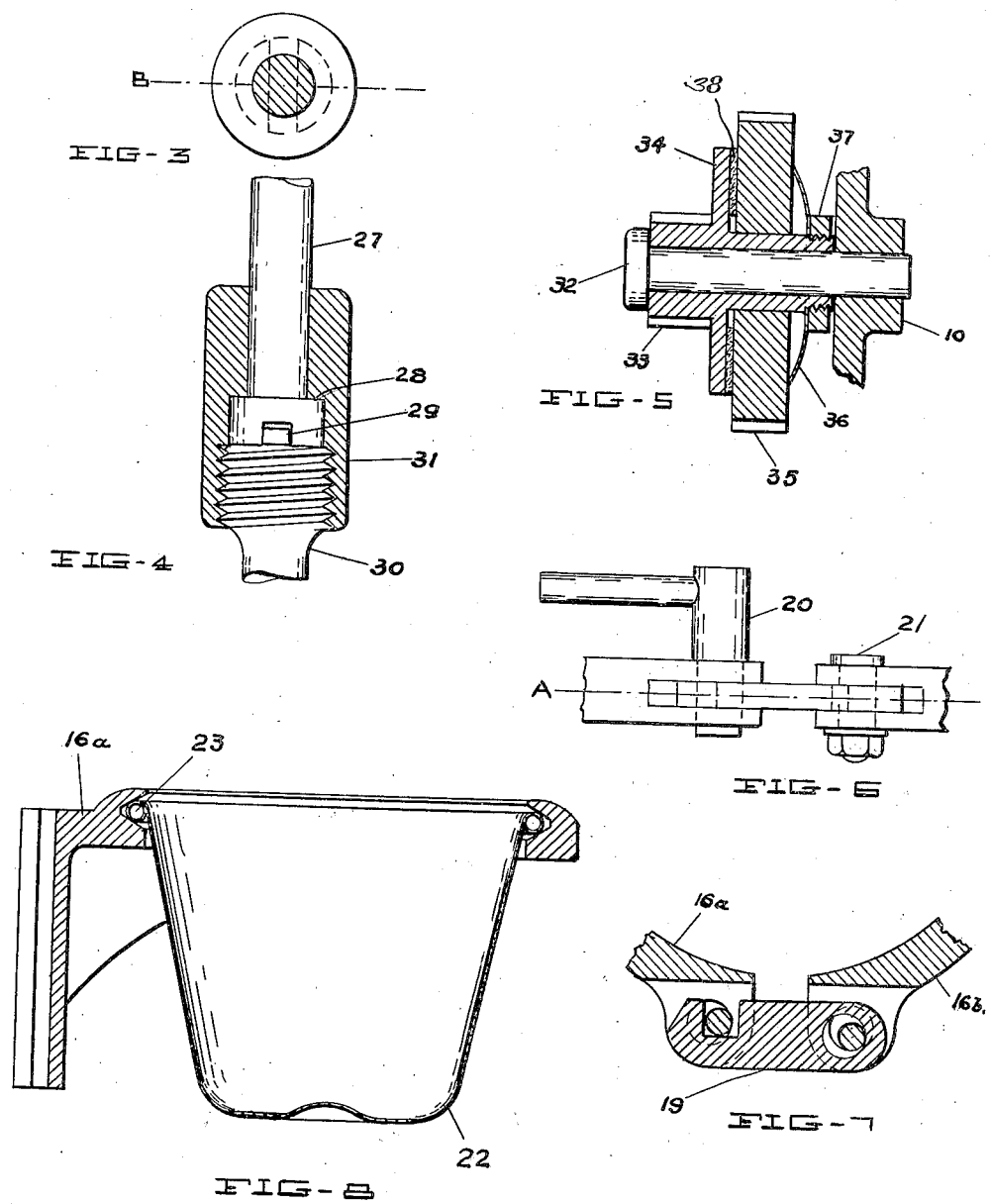

Patented Oct. 26, 1926.

1,604,242

UNITED STATES PATENT OFFICE.

CARL OSCAR AN. SMEDBERG, OF CHICAGO, ILLINOIS.

CULINARY MACHINE.

Application filed November 16, 1921. Serial No. 515,676.

The present invention relates to improvements in culinary or kitchen machines intended to perform the heavy labor incident to kneading, mixing and food chopping. The objects of the invention are to provide a machine of the character stated possessing novel characteristics in the arrangement of its parts for the transmission of power, for clamping or securing the mixing bowl in place, for holding the mixing or beating tools, and in the general mounting of the machine, thereby affording a machine of maximum simplicity and safety, and one which economizes in space when not in use.

With these and other objects in view the invention consists of certain novel combinations and arrangements of parts as will more fully appear in the description, the novel features thereof being embraced in appended claims. In the accompanying drawings, which form a part of this specification, similar figures refer to similar parts throughout the several views.

Figure 1:
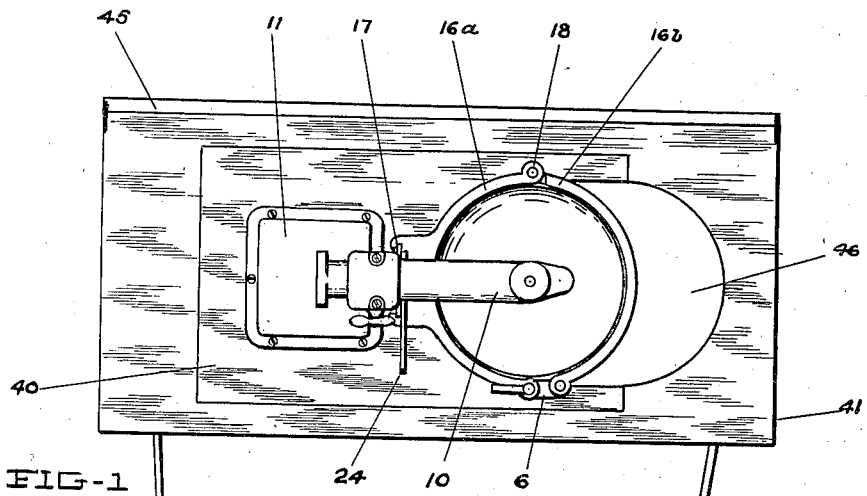
Figure 2:
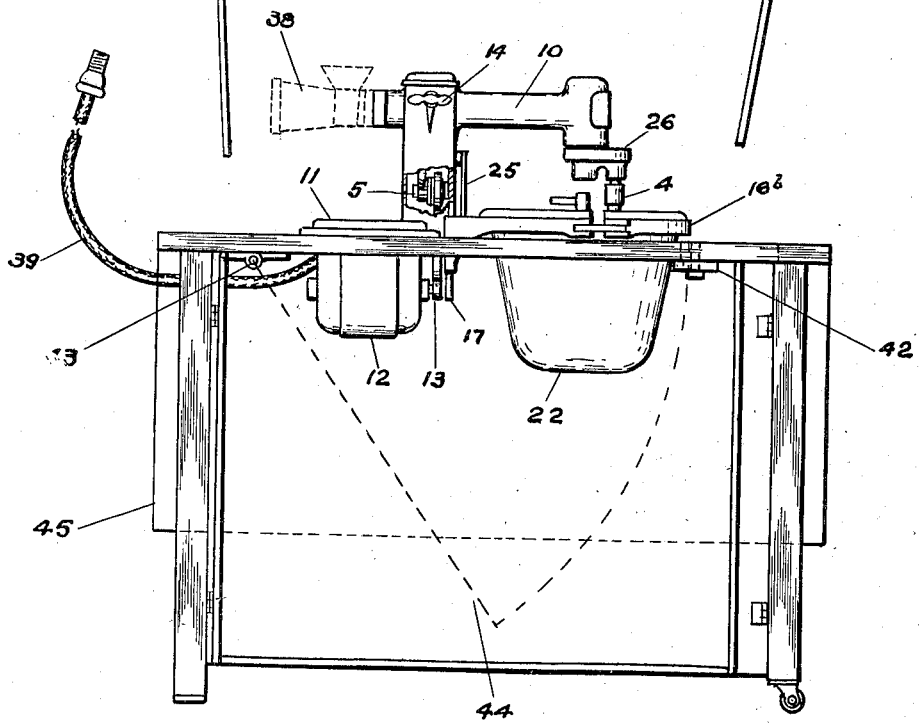

In the drawings, Fig. 1 is a top view of the machine mounted on a cabinet or table. Fig. 2 is a side elevation of Fig. 1. Fig. 3 a horizontal section of holder for the beaters or tools and the upper part of a beater shank (indicated in Fig. 2 as 4). Fig. 4 is a vertical section of Fig. 3 taken at line B. Fig. 5 is a vertical section of a safety clutch (indicated as 5 Fig. 2). Fig. 6 is an enlarged side view of bowl clamp lock, (indicated in Fig. 1 as 6). Fig. 7 is a horizontal section of Fig. 6 at line A. Fig. 8 is a vertical section of the mixing bowl and holder, showing method of holding the bowl.

In Figs. 1 and 2—10 indicates the frame or gear housing having a mounting base 11 located some distance above the lowest point of the frame, under which base is mounted a motor 12 in connection with gear train 13. This gear train is enclosed in housing 10. Part of this is cut away at 5, to show the safety device. This safety device or clutch is shown in detail in Fig. 5, and consists of stud 32 supported in frame 10. On this stud is rotatably mounted a pinion and sleeve 33, having flange 34, and on said sleeve is a threaded nut 37 and a spring 36, between which spring and flange 34 is a gear wheel 35 rotatably held with a friction disc 35ª, interposed between the gear and flange 34. The nut and spring referred to serve to regulate the resistance as desired. When the power transmitted through the gear train, reaches a prefixed resistance limit, a slippage between gear 35 and flange 34 will occur, allowing the motor to run while the gears stand still, thus avoiding accident and breakage. 14 is a handle operating a speed changing device (not shown) adapted to control the speed of the beaters. 16ª, and 16ᵇ, designate a bowl holder (also shown in Figs. 6, 7, and 8), the two parts being hinged together as at 18, and locked as at 6, Fig. 1. This bowl holder is slidably mounted on frame 10, at 17. The locking device 6, is shown in detail in Figs. 6 and 7, and consists of link 19, and eccentric bolts 20 and 21. These bolts being rotatable, different diameter bowls can be clamped in the holder as will be understood. Fig. 8 shows a novel way of holding bowl 22. It consists of gripping the bead 23 on the bowl in a V-shaped groove in the holder and clamping the same as described above. The advantage of being able to hold any shape of bowl in place without attaching lugs or braces to same is apparent.

Lever 24 and link 25 serve to raise or lower bowl and holder to suit beaters.

Gear train 13 above referred to, rotates a shaft inside the gear case 10 (not shown) which connects with and operates any apparatus, for example such as indicated by dotted lines 38, said gear train also rotating a shaft on which planet gear 26 is mounted. Rotated with and by said planet gear is a spindle and tool holder 4. (See also Figs. 3 and 4.)

In Fig. 4—27 is the spindle proper having a head 28 and key way 29,—30 being the threaded end of the beater or tool having a key at its upper end fitting into said key way 29. 31 is a rotatable threaded sleeve adapted to receive and hold in position the tool or beater, and rotate same with the spindle. When the sleeve is unscrewed from the beater it can be removed sideways without lowering the bowl which is a very desirable feature.

To remove bowl 22 from the holder, the lock or clamp 6 is opened and part 16ᵇ swung open after which the bowl can be moved out sideways.

The machine is mounted on a loose leaf 40 in a table or cabinet 41, and said leaf is hinged to the table at 43 at one end and supported by clamps 42 at the other end. By turning said clamps, leaf 40 together with the machine may be moved to the position indicated by the dotted lines 44 and be located wholly below the table. A hinged leaf 45 is then folded over the top making it a serviceable table or cabinet with the machine handy when wanted.

The free end of the leaf 40 is cut away to provide space immediately beneath the overhanging head of the gear case 10, into which space the bowl 22 may fit and be held by the holder members 16ᵃ and 16ᵇ. The holder members also overhang this space, and thus maintain the bowl in proper operative relationship to the mixer instrumentalities. The cut away portion of the leaf 40, when the latter is in the open position of the cabinet, is axially aligned with and in the same horizontal plane as a co-acting cut away portion in the top of the table or cabinet. These cut away portions together form an elliptical opening 46 the length of which is greater than the diameter of the mouth of the bowl 22. Therefore, when the holder member 16ᵇ is in open position, the bowl 22 may be passed downwardly into said opening 46, moved horizontally along the same into engagement with the member 16ᵃ, whereupon the member 16ᵇ is closed into engagement with the bowl and locked in such engagement by swinging the link 19 to closed position.

In operation, the machine is raised to the position shown in Fig. 2, bowl 22, with ingredients to be mixed or worked is placed in holder 16, the part 16ᵇ being swung outward allowing the bowl to be lowered into opening 46 in the table and moved into the holder, after which part 16ᵇ is clamped around the bowl. A suitable beater having a head 30 is then inserted in the holder or chuck 4, Fig. 1, and sleeve 31 screwed on securely. The motor 12, being connected to electric line by cord 39, is now started, rotating planet gear 26 and beater. The desired speed is obtained by turning handle 14.

No claim is made herein to the power drive shown and described, the same forming the subject-matter of a divisional application filed June 7, 1922, Serial No. 566,601.

I am aware that prior to my invention, food mixing machines have been made with planetary gears for mixing movements, speed change of same and lowering and raising the mixing bowl. I therefore do not claim such a combination broadly; but

I claim:—

1. In a machine of the class described, the combination with a table support having an opening therein, of a tool-operating head carried by said table support and overhanging said opening, a bowl arranged in said opening, and a holder also arranged over said opening and adapted to engage said bowl to maintain the latter in operative relation to said tool-operating head.

2. In a machine of the class described, the combination with a table support having an opening therein, of a tool-operating head carried by said table support and overhanging said opening, a bowl arranged in said opening, a holder also arranged over said opening and adapted to engage said bowl to maintain the latter in operative relation to said tool-operating head, and means for vertically adjusting said holder to vary the position of the bowl with respect to said head.

3. In a machine of the class described, the combination with a table support having an opening therein, of a tool-operating head carried by said table support and overhanging said opening, a bowl arranged in said opening, a holder adjustably mounted on said head and overhanging said opening, said holder being adapted to engage said bowl to maintain the latter in operative relation to said tool-operating head, and means for adjusting said holder vertically of said head to vary the position of the bowl with respect to said head.

4. In a machine of the class described, the combination with a support having an opening therein, of a tool-operating head carried by said support and overhanging said opening, a bowl arranged in said opening, and a holder also arranged over said opening and adapted to engage said bowl to maintain the latter in operative relation to said tool-operating head, said holder comprising a pair of pivoted members adapted to embrace the bowl, and means for locking said members into engagement with said bowl.

5. In a machine of the class described, the combination with a support having an opening therein, of a tool-operating head carried by said support and overhanging said opening, a bowl arranged in said opening, and a holder also arranged over said opening and adapted to engage said bowl to maintain the latter in operative relation to said tool-operating head, said holder comprising a pair of pivoted members adapted to embrace the bowl, a link pivotally connected to one of said members, and an eccentrically mounted bolt carried by the other member and with which said link is adapted to engage for locking said members into engagement with said bowl.

6. In a machine of the class described, the combination with a support having an opening therein, of a tool-operating head carried by said support and overhanging said opening, a bowl arranged in said opening, and a holder also arranged over said opening and adapted to engage said bowl to maintain the latter in operative relation to said tool-operating head, said holder comprising a pair of pivoted members adapted to embrace the bowl and extending across the opening, whereby when one of said members is swung to open position the other member is opened to the introduction of the bowl to the holder by horizontal movement of the bowl, and means for locking said members into engagement with said bowl.

7. In a machine of the class described, the combination with a support having an opening therein, of a tool-operating head carried by said support and overhanging said opening, a bowl arranged in said opening and provided with an external bead, and a holder also arranged over said opening and adapted to engage said bowl to maintain the latter in operative relation to said tool-operating head, said holder comprising a pair of pivoted members adapted to embrace the bowl and each provided at its inner face with a groove adapted to receive the bead of the bowl, and means for locking said members into engagement with the bowl.

8. In a machine of the class described, the combination with a tool-operating head, and a bowl provided with an external bead, of a holder for said bowl carried by said head and comprising a pair of pivoted members adapted to embrace the bowl, the inner face of each of said members having a groove adapted to receive the bead of the bowl, and means for locking said members into engagement with the bowl.

9. In a machine of the class described, the combination with a tool-operating head, and a bowl, of a holder for said bowl carried by said head and comprising a pair of members pivotally connected at one of their ends and adapted to embrace the bowl, a locking link carried by the other end of one of said members, and a locking bolt also carried by the other end of the other of said members and with which said link is adapted to engage, whereby to lock the members into engagement with said bowl.

10. In a machine of the class described, the combination with a table support, of a leaf hingedly connected thereto, and having its free end cut away to provide a space thereat, a tool-operating head carried by said leaf and overhanging said space, the contiguous portion of the table support also being cut away and co-operating with the space at the free end of the hinged leaf to form an elongated opening, a bowl arranged in said opening, and a holder for said bowl associated with said tool-operating head and overhanging said opening to maintain the bowl in operative relation to said head, the elongated opening serving to accommodate said bowl for introduction to and removal from said holder.

11. In a machine of the class described, the combination with a table support, of a leaf hingedly connected thereto and having its free end cut away to provide a space thereat, a tool-operating head carried by said leaf and overhanging said space, the contiguous portion of the table support also being cut away and co-operating with the space at the free end of the hinged leaf to form an elongated opening, a bowl arranged in said opening, and a holder for said bowl associated with said tool-operating head and overhanging said opening to maintain the bowl in operative relation to said head, said holder comprising a pair of pivoted members one of which is adapted to swing in the direction of the length of said opening for permitting introduction and removal of the bowl to and from said holder, the elongated opening serving to accommodate said bowl in its introduction to and removal from the holder, and means for locking said members in engagement with the bowl.

12. In a machine of the class described, the combination with a cabinet, of a leaf hingedly connected in the top of said cabinet and opening into the latter, means for sustaining said leaf in the plane of the top of the cabinet, one end of said leaf being cut away to provide a space thereat, the contiguous portion of the top of the cabinet also being cut away and cooperating with the cut away portion of said leaf to provide an elongated opening, a tool-operating head overhanging said opening, a holder associated with said head and also overhanging said opening, and a bowl arranged in said opening and engaged with said holder to be maintained by the latter in operative relation to the tool-operating head.

13. In a machine of the class described, the combination with a cabinet, of a leaf hingedly connected in the top of said cabinet and opening into the latter, means for sustaining said leaf in the plane of the top of the cabinet, one end of said leaf being cut away to provide a space thereat, the contiguous portion of the top of the cabinet also being cut away and cooperating with the cut away portion of said leaf to provide an elongated opening, a tool-operating head overhanging said opening, a holder associated with said head and also overhanging said opening, a bowl arranged in said opening, a bowl arranged in said opening and engaged with said holder to be maintained by the latter in operative relation to the tool-operating head, the latter, the holder, and the bowl being adapted to move with the leaf to the interior of the cabinet when the leaf is swung therein, and a cover hingedly connected to the exterior of the cabinet and adapted to close the top of the latter when the first mentioned leaf is swung into the cabinet.

In testimony whereof I affix my signature.

CARL OSCAR AN. SMEDBERG.